Figure 3:
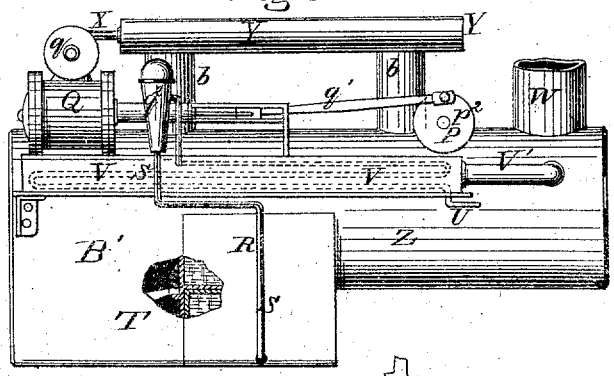

2 Sheets—Sheet 1.
B. YOCH,
Assignor, by mesne assignments, to C. COOPER, G. ROGERS, F. S. FAIRCHILD, and C. G. COOPER.
Portable and Road Engine.
No. 9,052. Reissued Jan. 20, 1880.
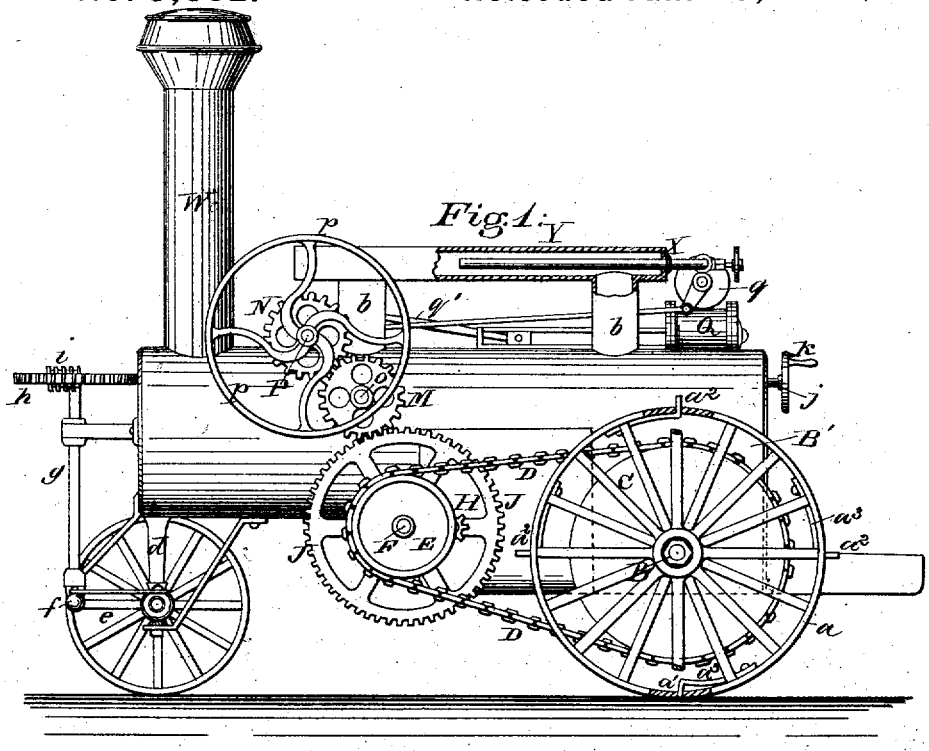
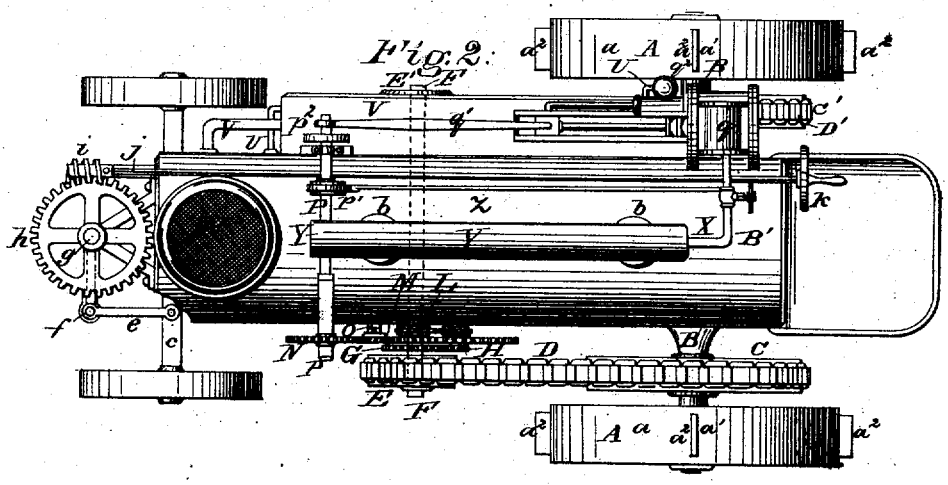
WITNESSES
INVENTOR
Benhard Yoch,
by W Bailey
his ATTORNEY

B. YOCH,

Assignor, by mesne assignments, to C. COOPER, G. ROGERS, F. S. FAIRCHILD, and C. G. COOPER.

Portable and Road Engine.

No. 9,052. Reissued Jan. 20, 1880.

WITNESSES

Geo. Gü

C. A. Dick

INVENTOR

Benhard Yoch, by M. Bailey his ATTORNEY.

UNITED STATES PATENT OFFICE.

BENHARD YOCH, OF WEST BELLEVILLE, ILLINOIS, ASSIGNOR, BY MESNE ASSIGNMENTS, TO CHARLES COOPER, GEORGE ROGERS, FRANK L. FAIRCHILD, AND CHARLES G. COOPER.

PORTABLE AND ROAD ENGINE.

SPECIFICATION forming part of Reissued Letters Patent No. 9,052, dated January 20, 1880

Original No. 177,052, dated May 2, 1876. Application for Reissue filed November 20, 1879.

*To all whom it may concern:*

Be it known that I, BENHARD YOCH, of West Belleville, in the county of St. Clair, State of Illinois, have invented certain new and useful Improvements in Combined Portable and Road Engines, which improvements are fully set forth in the following specification, reference being had to the accompanying drawings.

My improvements relate to an engine intended for use chiefly when at rest, but which is capable of being moved from place to place by its own machinery, and of drawing wagons, &c., with it.

The first part of my improvements consists in forming the traction-wheels with spring-calks, which extend through the rim of the wheel, and are formed upon the ends of plate-springs attached to the inside of such rims.

The second part of my improvements is directed to means for permitting differential movement of the traction or driven truck wheels, as is required, for instance, when the machine turns a corner or travels in a curved path, in which case one wheel should travel faster than the other.

To this end my improvement consists in the combination, with the independent truck or traction wheels, provided each with a main gear-wheel, of a counter-shaft having two gear-wheels, one fast and the other loose, geared to said main wheels, and compensating or differential gear on said counter-shaft connected to and receiving motion from the engine-shaft, substantially as hereinafter set forth.

The third part of my improvements applies to the steam-drum. This extends some distance above the boiler, and its ends are connected to two upright steam-vessels. The steam-pipe extending to the engine has its mouth at or near the middle of the longitudinal steam-drum, so that in ascending or descending a hill (where the boiler is much inclined) the water will at no time be in contact with the mouth of the steam-pipe.

The fourth part of my improvements consists in the construction of steering apparatus. In this there is a vertical shaft, having at bottom cross-arms whose ends are connected to the fore axle, and whose upper end carries a screw-gear wheel turned by a gear-screw on a shaft turned by a hand-wheel or crank at the furnace end of the machine.

Figure 4:
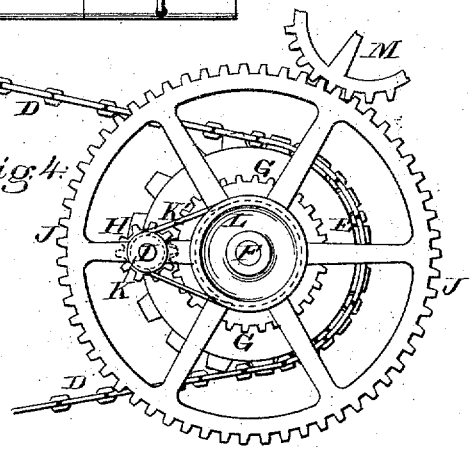
Figure 5:
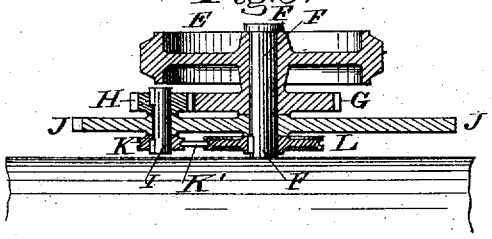

Figure 1 is a side view of engine, part in section. Fig. 2 is a top view. Fig. 3 is a detail side view of the feed-water apparatus. Fig. 4 is a detail, part in side elevation and part in section, illustrating part of the gear-connection between the engine and traction-wheels. Fig. 5 is a section at *x x*, Fig. 4.

The two traction-wheels A A′ are similarly constructed, having a sufficiently broad tread or rim, *a*, with transverse slots *a′*, in which work the spring-calks $a^2$. These calks form the outwardly-bent ends of the plate-springs $a^3$, whose other ends are attached to the insides of the rims *a*. The calks are to prevent the wheels from slipping in situation where this would otherwise take place, and the springing feature is for the purpose of allowing them to retire on coming in contact with a hard substance, so as to allow the wheel to roll smoothly over. Each wheel turns on its arbor or axle B, which projects from the side of the fire-box B′.

To the traction-wheels A A′ are attached chain-gear wheels C C′, connected by gear-chains D D′ to chain-wheels E E′. The chain-wheels E E′ are on the opposite ends of a counter-shaft running transversely near the middle of the machine. The wheel E′ is keyed fast to the shaft F; but the wheel E turns loosely on said shaft.

To provide for differential movement of the driven truck or traction wheels, I make use of compensating or differential gear mounted on the counter-shaft F. Said compensating-gear is here shown as consisting of the wheel J, mounted and turning loosely on the counter-shaft, and having rotation by gear-connection with the engine or crank shaft P. The wheel J carries a planet spur-pinion, H, keyed to a shaft, I, having journal-bearings in and eccentric to the axis of said wheel, which pinion gears with a spur-wheel, G, fast to the hub of loose wheel E. Upon the shaft I, on the opposite side of the wheel J from the pinion H, is attached a chain-gear wheel, K, connected by an endless chain, K′, to a chain-gear wheel, L, mounted on and attached to the counter-shaft F.

The spur-wheel J receives motion from the engine-shaft when the engine is moving from place to place, and the action of the rotation of the said wheel J is to cause the rotation of the independent traction-wheels through the instrumentality of the gears H G K L E E′ C C′, and the above-described construction of parts allows either of the traction-wheels to turn faster than the other, as is required, when traveling on a curve.

The wheel J (to cause its rotation) is engaged by a spur-wheel, M, which may be thrown out of gear with the spur-wheel J (and also that N) by sliding it endwise upon its arbor O. The spur-wheel N is upon the crank-shaft P of the engine, and this shaft carries the ordinary belt-wheel $p$, eccentric $p'$, and crank or crank-wheel $p^2$.

No novelty is claimed in the engine Q, in which $q$ is the steam-chest, $q'$ the connecting-rod, and $q^2$ the feed-water pump. This pump has a supply-pipe, R, leading to the water-tank S, in close proximity to the ash-pan T.

U is the eduction-pipe of the pump, which is coiled within the exhaust-steam box V, and extends to the boiler to feed water thereto. The steam from the engine exhausts into one side of the box V, and the steam passes out at the other end of said box through a pipe, V′, whose end is turned upward in the smoke-stack W to increase the draft.

X is the steam-pipe supplying the engine. This pipe X extends from the steam-chest or valve-box $q$ to about the mid-length of the long steam-drum Y, as shown in Fig. 1.

The steam-drum extends longitudinally above the boiler Z, and near its end is connected therewith by steam-boxes or vertical drums $b$ $b$. The arrangement is such that where the boiler is considerably inclined fore and aft dry steam will always pass to the engine, because the mouth of the steam-pipe, being at the mid-length of the steam-drum, will always be clear of water, even if it should fill one of the ends of the steam-drum.

The fore axle $c$ is capable of turning upon its pivot-bar $d$, and is turned to guide the machine by the following mechanism: $e$ $e$ are rods connecting the opposite ends of the axle to the ends of the cross-arms $f$ $f$ of the vertical shaft $g$. At the top of the shaft $g$ is a screw-gear wheel, $h$, engaged by a gear-screw, $i$, on the shaft $j$, extending to the other end of the boiler, and carrying a crank or hand wheel, $k$, by which the rod is turned.

I claim—

1. The traction-wheels supplied with spring-calks $a^2$, working in their rims, and projected more or less by the plate-springs $a^3$, substantially as set forth.

2. In a traction-engine, independent truck or traction wheels, provided each with a main gear-wheel, in combination with the counter-shaft having two gear-wheels, the one fast and the other loose, to gear with said main gear-wheels, the compensating-gear on said counter-shaft, and mechanism for transmitting movement to said compensating-gear from the engine, the combination being and acting substantially as herein set forth.

3. The combination of the shaft F, wheels G H J K L, and gear-chain K′, to cause the rotation of one or both of the wheels E E′ on shaft F, but allow different speeds of rotation in the said wheels by power applied to the loose wheel J, as set forth.

4. The combination of traction-wheels A A′, chain-gear wheels C C′ and E E′, gear-chains D D′, shaft F, spur-wheels G H J, chain-wheels K L, and chain K′, substantially as set forth.

5. The longitudinally-extended steam-drum Y, connected to steam-boxes $b$ $b$ at different parts of the boiler-top, substantially as set forth, and combined with the steam-pipe X, opening into the steam-drum at or near the mid-length of the latter, substantially as and for the purposes set forth.

6. The guiding mechanism consisting of horizontal shaft $j$, provided with worm $i$, gear-wheel $h$, vertical shaft $g$, cross-bar $f$, rods $e$ $e$, and axle $c$, as set forth.

In testimony whereof I have hereunto signed my name this 10th day of November, A. D. 1879.

BENHARD YOCH.

Witnesses:
SAML. KNIGHT,
GEO. H. KNIGHT.